United States Patent

Tanaka et al.

[11] 4,009,471
[45] Feb. 22, 1977

[54] INFORMATION TRANSFER SYSTEM

[75] Inventors: Atsuo Tanaka, Kanagawa; Koichi Tokura, Chiba; Hiroki Kawahara, Kawasaki, all of Japan

[73] Assignee: Fujitsu Ltd., Kawasaki, Japan

[22] Filed: June 20, 1975

[21] Appl. No.: 588,701

[30] Foreign Application Priority Data

June 24, 1974 Japan ............... 49-72061

[52] U.S. Cl. .................... 340/172.5
[51] Int. Cl.² ............ G06F 13/00; G11C 19/00
[58] Field of Search ............ 340/172.5; 445/1

[56] References Cited

UNITED STATES PATENTS

| | | | |
|---|---|---|---|
| 3,228,005 | 1/1966 | Delmege et al. | 340/172.5 |
| 3,320,594 | 5/1967 | Davies | 340/172.5 |
| 3,328,772 | 6/1967 | Oeters | 340/172.5 |
| 3,370,274 | 2/1968 | Kettley et al. | 340/172.5 |
| 3,401,375 | 9/1968 | Bell et al. | 340/172.5 |
| 3,417,375 | 12/1968 | Packard | 340/172.5 |
| 3,535,694 | 10/1970 | Anacker et al. | 340/172.5 |
| 3,543,245 | 11/1970 | Nutter | 340/172.5 |
| 3,593,313 | 7/1971 | Tomaszewski et al. | 340/172.5 |
| 3,631,401 | 12/1971 | Dinman | 340/172.5 |
| 3,634,882 | 1/1972 | McIlroy | 340/172.5 |
| 3,648,246 | 3/1972 | Zurla | 340/172.5 |
| 3,924,270 | 12/1975 | Kurtzberg | 340/172.5 |

Primary Examiner—Gareth D. Shaw
Assistant Examiner—Jan E. Rhoads
Attorney, Agent, or Firm—Daniel Jay Tick

[57] ABSTRACT

A control unit supplies information and includes a memory for storing information. A data bus connected to the control unit transfers the information. A controlled unit connected to the data bus receives information transferred from the control unit. The controlled unit comprises a plurality of $n$ circuit stages, wherein $n$ is a whole number, connected in tandem. The controlled unit includes first to $n^{th}$ circuit stages and an $i^{th}$ circuit stage intermediate the first and $n^{th}$ circuit stages and designated by the control unit. Information transferred from the control unit is stored in the first circuit stage and is transferred sequentially from the first to the $i^{th}$ circuit stages. Information stored in the first to $(i-1)^{th}$ circuit stages is transferred to the memory of the control unit via the data bus for storage in the memory when the control unit requires alteration of information stored in the $i^{th}$ circuit stage. Alternative information is transferred from the control unit to the first circuit stage. The information stored in the memory of the control unit is sequentially transferred to the first circuit stage thereby shifting the alternative information to the $i^{th}$ circuit stage.

4 Claims, 7 Drawing Figures

INFORMATION TRANSFER SYSTEM

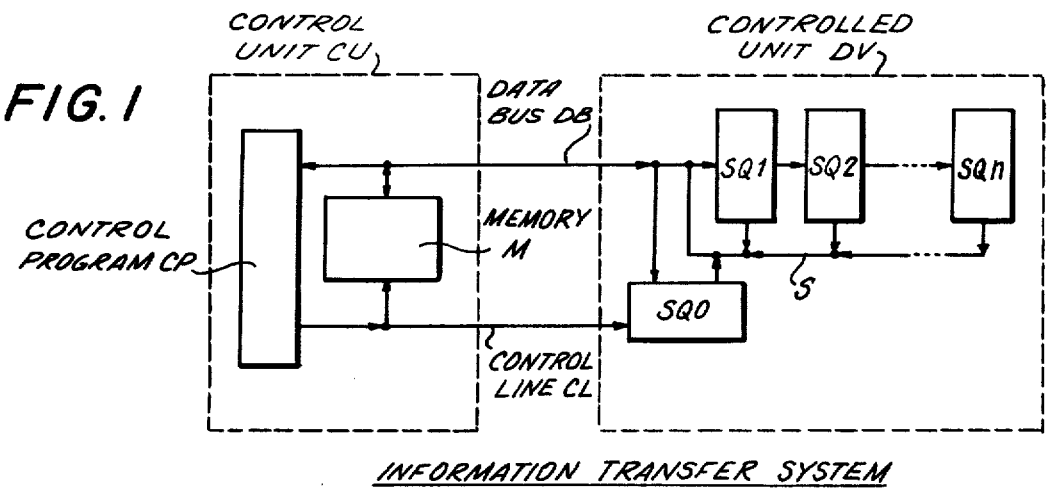
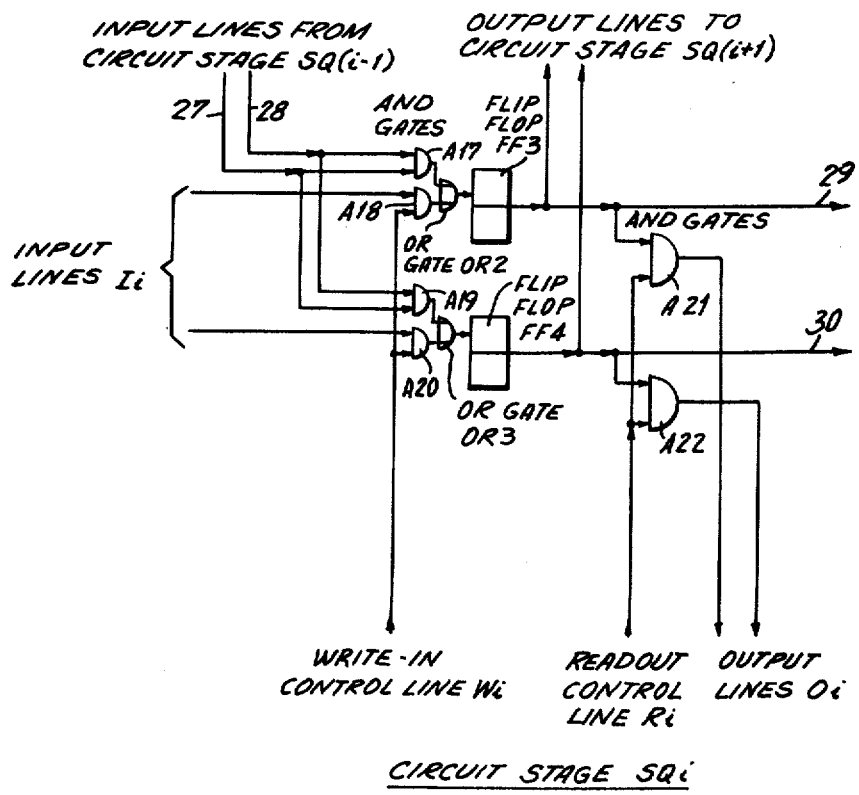

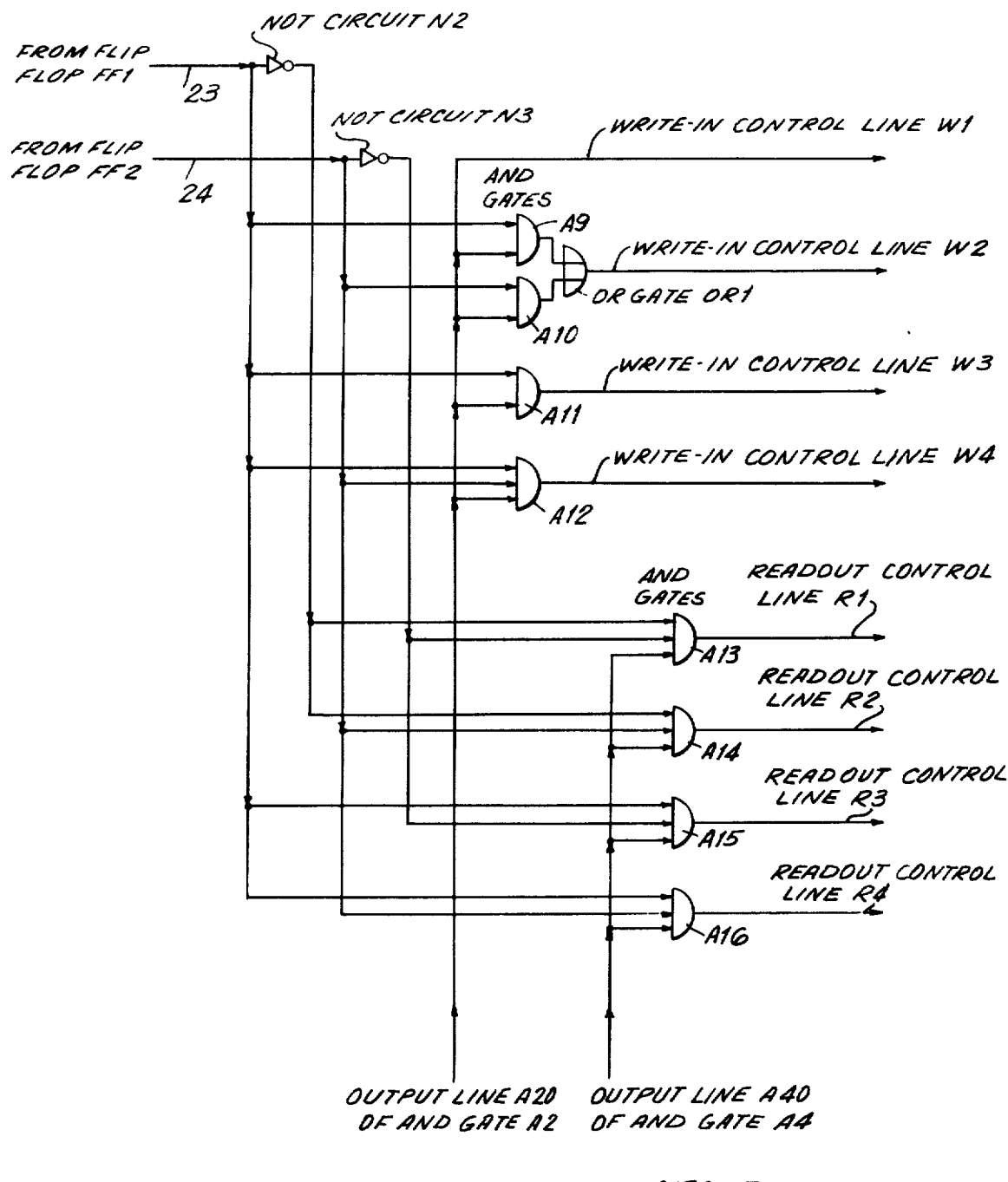

INFORMATION PROCESSING SYSTEM

TIME CHART OF OPERATION OF FIG. 6

PART DVI OF CENTRAL PROCESSING UNIT

INFORMATION TRANSFER SYSTEM

BACKGROUND OF THE INVENTION

The present invention relates to an information transfer system. More particularly, the invention relates to a system for sequentially transferring information from a control unit to a controlled unit having a plurality of circuit stages.

When it is required to operate a controlled unit such as, for example, an input-output control system according to an information, by transferring the information to the controlled unit for a control unit of the program control type such as, for example, a central processing unit, the controlled unit is provided with circuits such as registers for storing or setting the transferred information. The information is transferred from the control unit via a data bus and is stored or set in a circuit designated by the control unit according to the information. Therefore, if there are many circuits for storing or setting the transferred information, the information routes increase in accordance with the number of circuits, resulting in a complex and complicated circuit configuration.

If each circuit of the controlled device is formed to sequentially shift the transferred information to the next-successive circuit, in the manner of a shift register, the information transferred from the control unit may easily be set in the circuits. However, in order to transfer a new information to the relevant circuit, just like altering the storing or setting information of a selected one of the circuits, a direct information route from the data bus is required. In such a case, although information may easily be transferred only by shifting it, the succeeding information transfer is exactly the same as before.

The principal object of the invention is to provide an information transfer system for transferring new information to a selected circuit via a data bus without altering the information content of other circuits.

An object of the invention is to provide an information transfer system of a structure more simple than those of known similar systems and which overcomes the shortcomings of such known systems.

Another object of the invention is to provide an information transfer system of simple structure, which permits the alteration of information in a selected circuit without altering information stored in other circuits connected in circuit therewith and without the need for a specific information line for transferring the information to the selected circuit.

Still another object of the invention is to provide an information transfer system utilizing a data bus for controlling a plurality of circuit stages and utilizing such bus for transferring altered information to a selected one of the circuit stages thereby simplifying the circuit arrangement of the information transfer system.

Yet another object of the invention is to provide an information transfer system of simple structure which functions efficiently, effectively and reliably to transfer information and altered information to a plurality of circuits and to a specified circuit, respectively.

BRIEF SUMMARY OF THE INVENTION

The present invention is an information transfer system which transfers altered or new information to a selected one of a plurality of circuit stages via a data without altering information stored in the other circuit stages.

In accordance with the invention, an information transfer system comprises control means for supplying information. The control means includes memory means for storing information. Data bus means is connected to the control means for transferring the information. Controlled means connected to the data bus means received information transferred from the control means. The controlled means comprises a plurality of $n$ circuit stages, wherein n is a whole numer, connected in tandem. The controlled means includes first to $n^{th}$ circuit stages and an $i^{th}$ circuit stage intermediate the first and $n^{th}$ circuit stages and designated by the control means. Means stores information transferred from the control means in the first circuit stage and transfers the information sequentially from the first to $i^{th}$ circuit stages. Means transfers information stored in the first to $(i-1)^{th}$ circuit stages to the memory means of the control means via the data bus means for storage in the memory means when the control means requires alteration of information stored in the $i^{th}$ circuit stage. Means transfers alternative information from the control means to the first circuit stage. Means sequentially transfers the information stored in the memory means of the control means to the first circuit stage thereby shifting the alternative information to the $i^{th}$ circuit stage.

BRIEF DESCRIPTION OF THE DRAWINGS

In order that the invention may be readily carried into effect, it will now be described with reference to the accompanying drawings, wherein:

FIG. 1 is a block diagram of an embodiment of the information transfer system of the invention;

FIG. 3 is a block diagram of an embodiment of the gate selection circuit of the controlled unit of the information transfer system of the invention;

FIG. 4 is a block diagram of one of the circuit stage SQi of the circuit stages SQ1 to SQn of the controlled unit of the information transfer system of the invention;

In the Figures, the same components are identified by the same reference numerals.

DETAILED DESCRIPTION OF THE INVENTION

Figure 2:
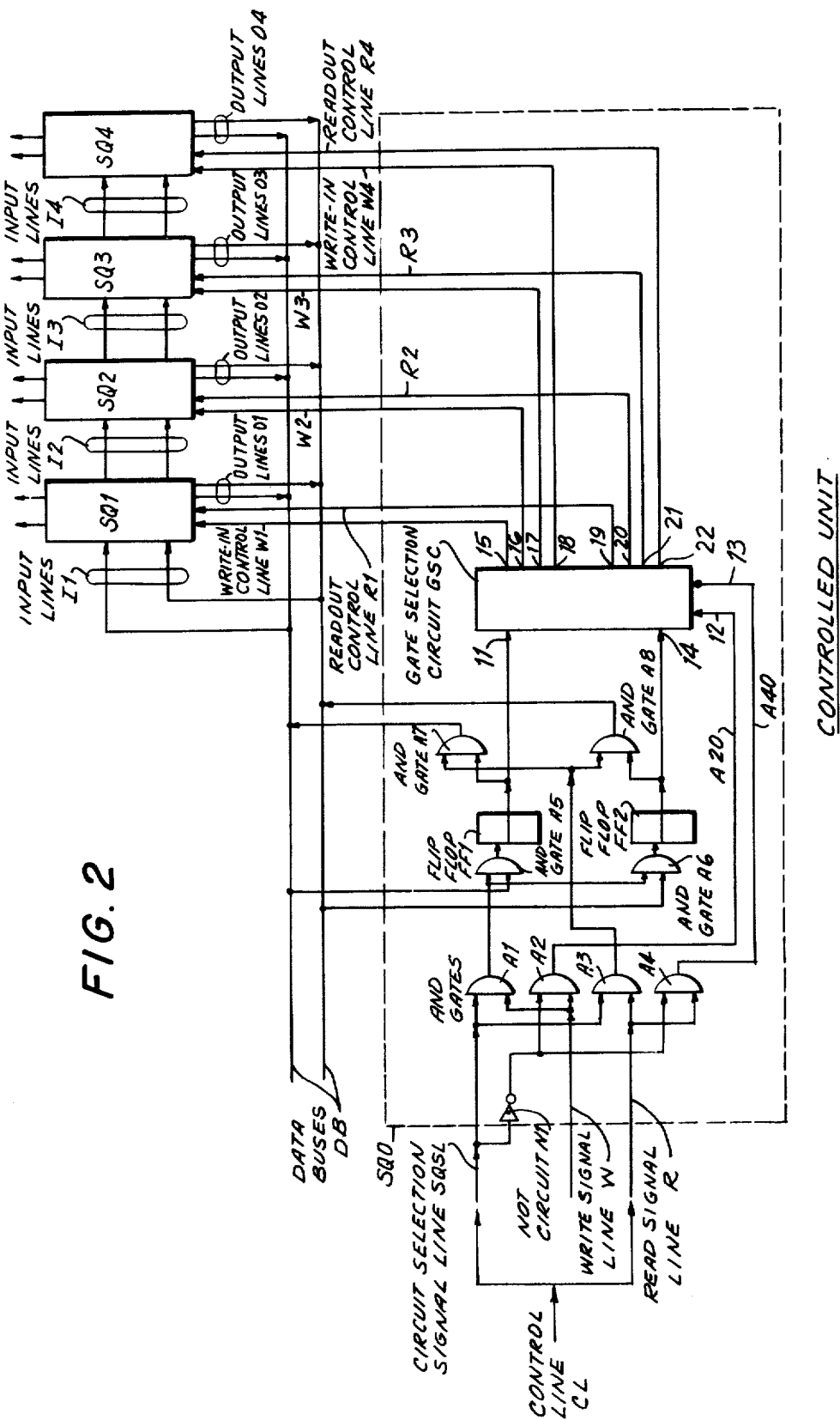
FIG. 2 is a block diagram of an embodiment of the controlled unit of the information transfer system of the invention.

FIG. 1 is a block diagram of an embodiment of the information transfer system of the invention. The information transfer system of FIG. 1 comprises a control unit CU which may be a central processing unit. A controlled unit or device DV is connected to the control unit CU via a data bus DB and a control line CL. The controlled unit DV may be a central processing unit or an input-output control system of an information or data processing system. The control unit CU includes a control program CP.

Information is also transferred to the controlled unit DV via the data bus DB according to a control program CP of the control device CU. Information is also transferred to the control device CU from the controlled device DV.

The controlled device DV comprises a plurality of circuit stages SQ0 to SQn. The circuit stages SQ0 to SQn are respectively capable of storing or setting information like a register and are connected in tandem or series. The circuit stages SQ0 and SQ1 are directly supplied with information or data from the control unit CU via the data bus DB. The information stored in the circuit stage SQ1 may be shifted sequentially to the succeeding circuits SQ2, SQ3 . . . SQn. However when the information is shifted to a selected one of the circuit stages SQi, the circuit stages SQ($i$+1) to SQn do not permit adequate information shifting.

The circuit stage SQ0 controls the shifting of data or information in the circuit stages SQ1 to SQn via the control line CL. Information in a circuit stage preceding the selected circuit SQi, designated by the control unit CU, is transferred to said control unit, together with information stored in the circuit stage SQ0, via a circuit path S and is temporarily stored in a memory M of said control unit.

When information is transferred from the control unit CU to a selected number of circuit stages up to the circuit stage SQi, the circuit number information for storing or setting the information or data is provided by said control unit to the circuit stage SQ0. The information is transferred sequentially from the control unit CU and is shifted in accordance with the number information in the circuit stage SQ0. At such time, there is no shifting of data or information to the circuit stages SQ($i$+1) to SQn. The information is thus stored or set in the selected circuit stage SQi.

Furthermore, when new information or data is set or stored in the selected circuit stage SQi, information stored or set in the circuit stages SQ1 to SQ($i$−1) is transferred to the memory M of the control unit CU via the circuit path S and the data bus DB and is temporarily stored in said memory. Thereafter, the information to be stored or set in the circuit stage SQi is transferred to the controlled unit DV. The information is read out from the memory M of the control unit CU in the sequence of the circuit stages SQ($i$−1), SQ($i$−2), . . . SQ1, and is transferred to the controlled unit DV. Therefore, new information or data is stored or set in the circuit stage SQi of the circuit stages SQ1 to SQn. The storage or setting of the information may thus be accomplished via the same transfer route or circuit path as the initial setting or storage without altering the circuit conditions.

The transfer of information between the control unit CU and the controlled unit DV via the data bus DB, as hereinbefore explained, is controlled by the control program CP of said control unit. The circuit stage SQ0 is the information transfer designation circuit of the controlled unit DV, so the information is transferred to said circuit stage and is transferred according to the contents. In addition, when the stored contents of all the circuit stages SQ0 to SQn are altered, as in the case of the initial setting, information or data must be transferred in sequence by a method other than the aforedescribed method.

FIG. 2 shows an embodiment of the controlled unit DV of FIG. 1. In FIG. 2, the circuit stage SQ0 comprises a plurality of AND gates A1 to A8, a NOT circuit N1, a pair of flip flops FF1 and FF2 and a gate selection circuit. The control line CL supplies a circuit selection signal, via a circuit selection signal line SQSL, to an input of each of the AND gates A1 and A3 and to an input of each of the AND gates A2 and A4 via the NOT circuit N1. The control line CL supplies a write signal, via the write signal line W, to another input of each of the AND gates A1 and A2, and supplies a read signal, via the read signal line R, to another input of each of the AND gates A3 and A4.

The output of the AND gate A1 is connected to the input of a flip flop FF1 via an input of the AND gate A5 and to the input of a flip flop FF2 via an input of the AND gate A6. The data buses DB are connected to the inputs of the flip flops FF1 and FF2 via the AND gates A5 and A6, respectively. The output of the flip flop FF1 is connected to one of the data buses DB via an input 11 of the AND gate A7 and is connected to an input of the gate selection circuit GSC. The output of the AND gate A2 is connected to an input 12 of the gate selection circuit GSC via a lead A20. The output of the AND gate A3 is connected to one of the data buses DB via another input of the AND gate A7 and to the other of the data buses via an input of the AND gate A8. The output of the AND gate A4 is connected to an input 13 of the gate selection circuit GSC via a lead A40.

The output of the flip flop FF2 is connected to the other of the data buses DB via another input of the NAND gate A8 and to an input 14 of the gate selection circuit GSC. The gate selection circuit GSC has a plurality of outputs 15 to 18 connected to write-in control lines W1, W2, W3 and W4, respectively, of the circuit stages SQ1, SQ2, SQ3 and SQ4 and a plurality of outputs 19 and 22 connected to readout control lines R1, R2, R3 and R4, respectively, of said circuit stages. The circuit stages SQ1 to SQ4 have pairs of outputs 01, 02, 03 and 04, respectively, connected to the data buses DB. A pair of input lines I1 are connected from the data buses DB to the circuit stage SQ1. Pairs of input lines I2, I3 and I4, respectively, are connected between each of the circuit stages SQ1, SQ2 and SQ3 and the next-succeeding circuit stages.

Since two data buses DB are included in FIG. 2, two flip flops are provided. Furthermore, four circuit stages are shown in FIG. 2. When two data buses are used, the total information or data routes become 4 ($2^2 = 4$), so that four circuit stages may be provided. Of course, the present invention is not limited to a control unit having two data buses.

When an information for designating a circuit stage SQ is supplied via the data bus, there is a control function, so that the signal in the circuit selection signal line SQSL becomes 1. When specified information or data is to be stored or set in the circuit stage SQ1, a signal or information "00" for designating the circuit stage SQ1 is supplied to the data bus DB and the signal in the write signal line W becomes "1" for writing the data into the circuit stage SQ1. Therefore, the data "0" is stored in both flip flops FF1 and FF2. The data to be stored or set in the circuit stage SQ1 is then provided via the data bus DB. At such time, there is a control function, so that the signal in the write-in control line W1, provided by the gate selection circuit GSL, becomes "1".

As hereinafter explained in greater detail, when its write-in control line has a "1" signal, each circuit stage SQ stores the information on its input line, and when the signal in the read control line R becomes "1", the memory content of the circuit stage is supplied to the output lines of said circuit stage. Thus, desired data is stored or set in the circuit stage SQ1. Similarly, when the information stored in the circuit stage SQ2 is read out, the information "01", designating the circuit stage SQ2, is supplied to the data bus DB and the signal in the write signal line W becomes "1", so that the flip flops FF1 and FF2 are set to "0" and "1", respectively. The signal in the read signal line R becomes "1" and the signal in the circuit selection signal line SQSL becomes "0". The gate selection circuit GSC provides a signal "1" in the readout control line R2 via the AND gate A4. The information stored in the circuit stage SQ2 is thus supplied to the data bus DB.

FIG. 3 shows a gate selection circuit. The gate selection circuit of FIG. 3 has input leads 23 and 24 from the flip flops FF1 and FF2, respectively, of FIG. 2, and input leads 25 and 26 connected to the output line A20 of the AND gate A2 and to the output line A40 of the AND gate A4 of FIG. 2. The ouput leads of the gate selection circuit of FIG. 3 are connected to the write-in control lines W1, W2, W3 and W4 and to the readout control lines R1, R2, R3 and R4, respectively, of FIG. 2.

The gate selection circuit of FIG. 3 comprises a pair of NOT circuits N2 and N3, a plurality of AND gates A9 to A16 and an OR gate OR1. The input lead 23 is directly connected to a first input of each of the AND gates A9, A11, A12, A15 and A16, and is connected to a first input of the AND gate A13 and a first input of the AND gate A14 via a NOT circuit N2. The input lead 24 is directly connected to a first input of the AND gate A10 and to a second input of each of the AND gates A12, A14 and A16, and is connected to a second input of each of the AND gates A13 and A15 via a NOT circuit N3. The input lead 25 is connected to the write-in control line W1, to a second input of each of the AND gates A9, A10 and A11 and to a third input of the AND gate A12. The input lead 26 is connected to a third input of each of the AND gates A13, A14, A15 and A16.

The outputs of the AND gates A9 and A10 are connected to the write-in control line W2 via an OR gate OR1. The outputs of the AND gates A11 and A12 are connected to the write-in control lines W3 and W4, respectively. The outputs of the AND gates A13, A14, A15 and A16 are connected to the readout control lines R1, R2, R3 and R4, respectively.

The operation of the gate selection circuit of FIG. 3 is described via an example in which desired data or information is stored or set in the circuit stage SQ3. The control unit CU provides the data of "10" for designating the circuit stage SQ3 to the data bus DB. This provides a signal "1" in the circuit selection signal line SQSL and a signal "1" in the write signal line W and sets "1" and "0" in the flip flop FF1 of FIG. 2. The control unit CU provides a signal "0" in the circuit selection signal line SQSL and supplied the data for setting the circuit stage SQ3, the data for setting the circuit stage SQ2, and then supplies the data for setting the circuit stage SQ1 to said circuit stages via the data bus DB, sequentially according to the three write signals of "1".

Since the flip flop FF1 of FIG. 2 is in the state "10" at the gate selection circuit GSL in the controlled unit DV, the signals in the write-in control lines W1 to W3 become "1" each time the control unit CU provides a signal "1" in the write signal line W. Therefore, data transmitted via the data bus DB is sequentially shifted from the circuit stage SQ1 to the circuit stage SQ3. At this time, the data is not set in the circuit stage SQ4, because the signal in the write-in control line W4 does not become "1".

Then, if the data is to be read out from the selected or desired circuit stage, the code for designating said circuit stage is set in the flip flop FF1, as hereinbefore described, via the data bus DB, in order to provide a signal "1" in the read signal line R. On the basis of the state of the flip flop FF1, one of the AND gates A13 to A16 is added, and the signal in one of the read control lines R1 to R4 becomes "1".

The content of the selected one of the circuit stages SQ is supplied to the output line and transmitted via the data bus DB.

FIG. 4 shows a selected one of the circuit stages SQ, which is SQi. The circuit stage SQi comprises AND gates AND A17, A18, A19, A20, A21 and A22, a pair of OR gates OR2 and OR3, and a pair of flip flops FF3 and FF4. Input lines 27 and 28 connect the circuit stage SQ($i-1$), next-preceding the circuit stage SQi, to both inputs of the AND gate A17 and to both inputs of the AND gate A19. Input lines Ii from the control unit CU are connected to a first input of each of the AND gates A18 and A20, respectively. A write-in control line Wi from the gate selection circuit GSC (FIG. 2) is connected to a second input of each of the AND gates A18 and A20. The outputs of the AND gates A17 and A18 are connected to the inputs of the OR gate OR2 and the output of said OR gate is connected to the input of the flip flop FF3. The outputs of the AND gates A19 and A20 are connected to the inputs of the OR gate OR3 and the output of said OR gate is connected to the input of the flip flop FF4.

The output of the flip flop FF3 is connected to one of the output lines to the circuit stage SQ($i+1$), a lead 29, and a first input of the AND gate A21. The output of the flip flop FF4 is connected to the other of the output lines to the circuit stage SQ($i+1$), a lead 30, and a first input of the AND gate A22. A readout control line Ri from the gate selection circuit GSC (FIG. 2) is connected to a second input of each of the AND gates A21 and A22. The outputs of the AND gates A21 and A22 are connected to output lines Oi of the circuit stage.

When the write-on control signal Wi becomes "1", the information in the input signal lines Ii is stored in the flip flops FF3 and FF4. When a signal "1" is provided in the readout control line Ri, the contents of the flip flops FF3 and FF4 are supplied to the output signal lines Oi.

Figure 5:
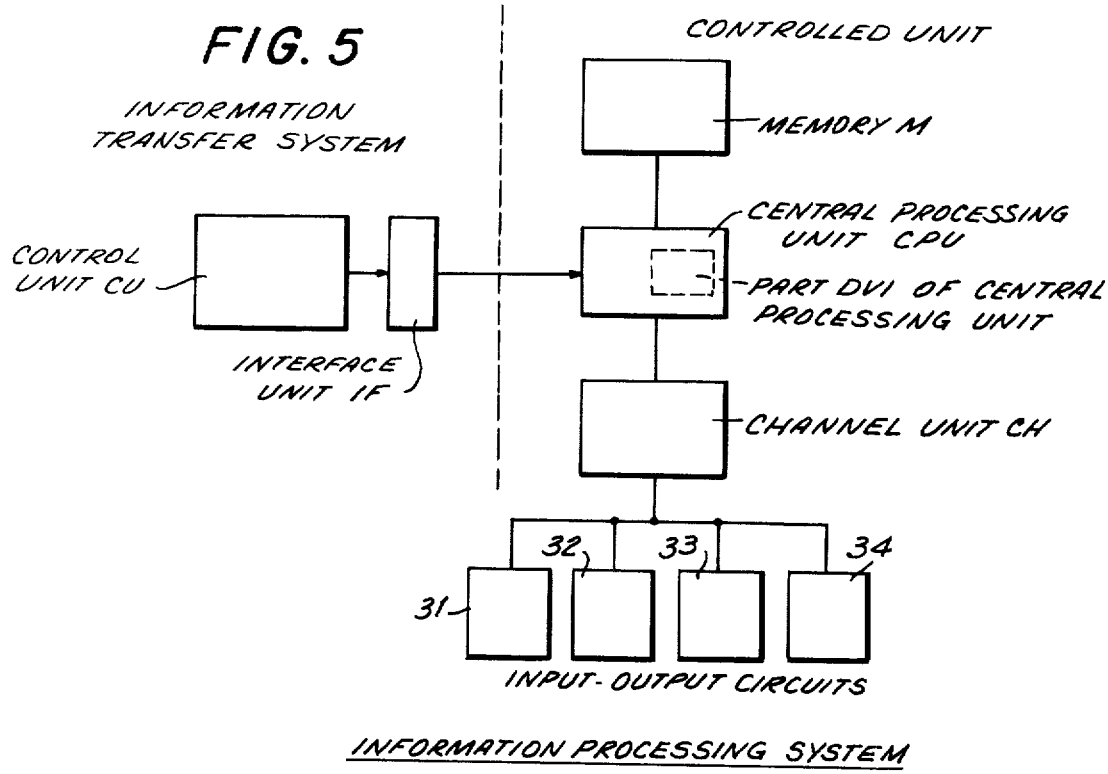
FIG. 5 is a block diagram of an information processing system utilizing the information transfer system of the invention.

FIG. 5 shows an example of the application of the information transfer system of the invention to an information processing system. The control unit CU is connected to a central processing unit CPU of the controlled unit via an interface unit IF. The central processing unit CPU includes a part DVI and is connected to a memory M. The central processing unit CPU is connected in common to a plurality of input-output circuits 31, 32, 33 and 34 via a channel unit CH.

The information processing system of FIG. 5 is an ordinary known system, except that it is connected to the control unit CU. The control unit CU supervises the state of the central processing unit CPU or sets or stores the data in the register of the central processing unit for the purpose of maintenance or testing. A program accumulation type processing unit is used as the control unit CU and is capable of displaying the data via a display device by reading out the data from the controlled unit. In the system of FIG. 5, the system of the invention transfers the information from the control unit to the controlled unit.

Figure 7:
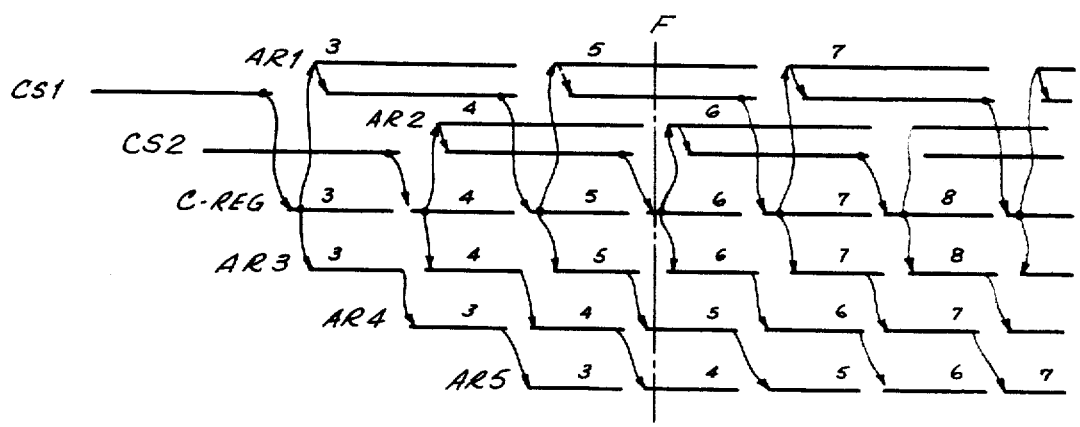
FIG. 7 is a time chart of the circuit of FIG. 6.
Figure 6:
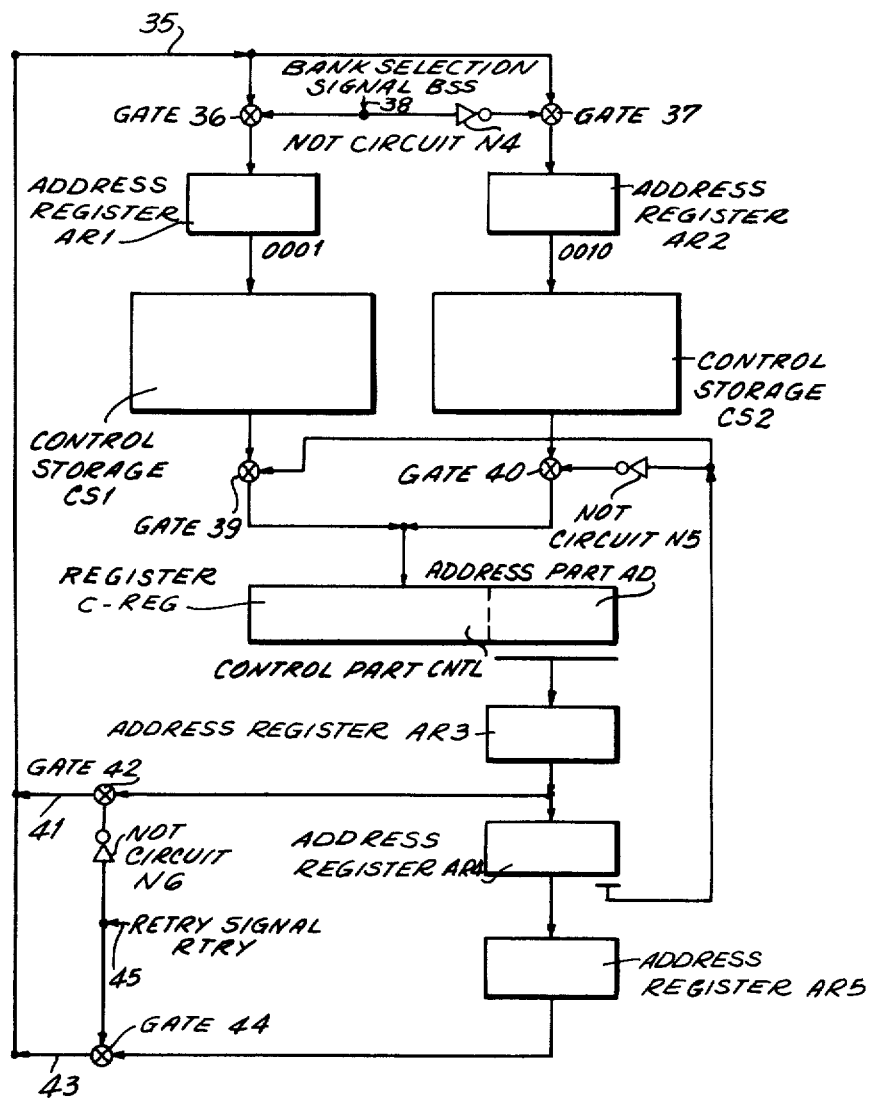
FIG. 6 is a block diagram of the part DV1 of the central processing unit of FIG. 5.

FIG. 6 shows an embodiment of the part DV1 of the central processing unit CPU of FIG. 5. FIG. 7 is a time chart of the embodiment of FIG. 6. The part DV1 of the central processing unit CPU comprises an input lead 35 connected to the input of each of a pair of address registers AR1 and AR2 via gates 36 and 37, respectively, of any suitable type. A bank selection signal BSS is supplied to the gate 36 via a blank selection signal input 38. The bank selection signal input 38 is connected to the gate 37 via a NOT circuit N4. The output of the address register AR1 is connected to the input of a control storage CS1 and the output of the address register AR2 is connected to the input of a control storage CS2.

The outputs of the control storages CS1 and CS2 are connected in common to the input of a register C-REG via gates 39 and 40, respectively, of any suitable known type. The register C-REG has a control part CNTL and an address part AD. The register C-REG is coupled to an output lead 41 via an address register AR3 and a gate 42 of any suitable type and to an output lead 43 via a pair of address registers AR4 and AR5 and a gate 44 of any suitable type.

The address register AR4 is coupled to the gate 39 and to the gate 40 via a NOT circuit N5. A retry signal RTRY is supplied via a retry signal input 45, which is connected to the gate 44 and to the gate 42 via a NOT circuit N6. The address registers AR1 to AR5 correspond to the aforedescribed circuit stages SQ. Data or information read out from the control storages or memories CS1 and CS2 is stored or set in the register C-REG. The control part CNTL of the register C-REG stores the control bits of data read out from the control memories CS1 and CS2, and said control bits control the switching of the gates 39 and 40. The address part AD of the register C-REG stores the addresses of the data read out from the control memories CS1 and CS2.

The odd addresses are stored in the control memory CS1 and the even addresses are stored in the control memory CS2. In general, executable instructions are provided in the form of a series of addresses, and therefore access is provided alternately for the control storages or memories CS1 and CS2. Processing may be accomplished at a speed of substantially twice the memory cycle. In other words, the address is first stored or set in the address register AR1, in order to provide access to the control memory CS1. The address is then stored or set in the address register AR2 before the data is read out from the control storage CS1 to the register C-REG, in order to provide access to the control memory CS2. This is called "preceding control". When there is preceding control, the address must be held during the specified period. The address is held, for example, since it is necessary for readying the system for a retry. The address registers AR4 and AR5 may serve as address holding registers.

The retry signal RTRY is "1" when there is to be a retry. The bank selection signal BSS determines in which register, AR1 or AR2, the address should be stored or set. This is accomplished by 1 bit of the address part AD.

In order to facilitate the explanation of the operation of the system of FIG. 6, it is supposed that the address "0001" is stored in the address register AR1 and the address "0010" is stored in the address register AR2. At such time, the address part AD of the data in the address "0001" read out from the control storage CS1 is "0011", and when it is read out to the register C-REG it is transferred to the registers AR1 and AR2. At such time, since the lowest bit of the address part is "1", the bank selection signal BSS becomes "1". Therefore, "0011" is not transferred to the address register AR2, but is tranferred to the address register AR1. Thus, access to the control storage CS1 starts.

During the access to the control storage CS1, the contents of the address register AR3 are transferred to the address register AR4. The data in the address "0010" is read out from the control memory CS2 to the register C-REG. The address part AD of the data is "0100". The lowest bit is "0". Therefore, the bank selection signal BSS is also "0" and the address "0100" is set in the address register AR2. Thus, access to the control storage CS2 starts.

During access to the address "0100" of the control storage CS2, the contents of the address register AR4 are transferred to the address register AR5 and the contents of the address register AR3 are transferred to the address register AR4. Thus, the data of the address "0011" is read out from the control storage CS2 to the register C-REG. The address part AD is then "0101".

Thus, access is sequential in a similar manner and the data of the addresses 1, 2, and so on, is read out to the register C-REG, in the execution of the processing sequence.

It is now supposed that a fault occurs when the data in the address "0100" is being read out from the control storage to the register C-REG, under control, or just after reading out, and that the contents of said register are destroyed. Restarting shall begin from the reading out of the data in the address "0100". Therefore, it is essential to start the processing again by providing a "1" retry signal RTRY and by transferring the contents "0100" of the address register AR5 to the address register AR2.

The data bus, although not shown in FIG. 6, is provided for reading out the contents of each register. Therefore, when the specified data or address is to be stored or set in the desired register, the necessary contents of the register shall be stored in the memory M of the control unit CU, as shown in FIG. 1, and the necessary data is first stored or set in the register C-REG. The contents stored in the memory M of the control unit CU are then read out and shifted between the registers until said contents are stored or set in the register C-REG.

As hereinbefore described, the information transfer system of the present invention is capable of sequentially transferring data or information sequentially from the control unit CU via the data bus DB, by providing circuit stages SQ1 to SQn, which store such data by sequential shifting in the controlled unit DV. In addition, when it is required to alter the content of a selected or desired circuit stage SQi, the information or data of each circuit stage preceding the circuit stage SQi is once transferred to the control unit CU for storage and such temporarily stored information is then sequentially transferred to the controlled unit DV and shifted to the circuit stage SQi after the data to be stored or set in the circuit SQi is transferred to said controlled unit. The information is thus stored or set in the circuit stages SQ1 to SQi by preventing shifting of data in the circuit stages SQ($i + 1$) to SQn. Thus, only the contents of the selected or desired circuit stage SQi are altered without changing the data or information in the other circuit stages, and there is no need to provide a particular information line for setting or storing the data in the circuit stage SQi.

It is an important advantage of the information transfer system of the invention that a data bus S is used for the supervision of the circuit stages SQ1 to SQn. Since the information or data of the circuits or circuit stages preceding the selected or designated circuit or circuit stage may be transferred via the data bus S, the circuit configuration is simple, non-complex and uncomplicated.

While the invention has been described by means of a specific example and in a specific embodiment, we do not wish to be limited thereto, for obvious modifications will occur to those skilled in the art without departing from the spirit and scope of the invention.

We claim:

1. A data transfer system having a control unit, a controlled unit having a plurality of $n$ data setting means and data bus and control leads, said control unit being connected to said controlled unit via said data bus and control leads, the contents of selected data setting means of a plurality of $n$ data setting means of said control unit being modified from said control unit, said data transfer system comprising control means for the controlled unit, said control means being included in the control unit and including memory means, said control means controlling the handling of data of the memory means, data transfer between the memory means and the data bus and the transmission of the commands to the controlled unit, the plurality of data setting means having configurations providing parallel shifts of data, and the controlled unit having a configuration which is such that the contents of selected data setting means are transferred to the data bus, only data from the data bus to the first data setting means is written, and the plurality of data setting means are parallel shifted from the first data setting means to the selected data setting means on the basis of a command from the control means for the controlled unit to the control leads and data bus, whereby when the contents of the ith data setting means of the controlled unit, wherein $i$  $n$, are to be modified from the control unit, the contents of the first to $(i-1)$th data setting means are transferred to the bus bar in accordance with commands sequentially issued from the control means for the controlled unit for the contents of said data setting means, and data on the data bus is sequentially stored in the memory means, the control means for the controlled unit thereafter transferring data to be modified to the data bus and issuing write commands thereby setting modification data in the first data setting means, and the control means for the controlled unit thereafter sequentially reads out data stored in the memory means, transfers the read out data to the data bus and issues parallel shift and write commands for the first to ith data setting means whenever data is transferred whereby the contents of the ith data setting means are modified.

2. A data transfer system as claimed in claim 1, wherein each of the data setting means comprises a parallel shift register.

3. A data transfer system as claimed in claim 1, wherein the control means for the controlled unit includes gate selection circuit means connected to the outputs of said control means for controlling the write-in and read out of data to and from selected ones of said data setting means.

4. A data transfer system as claimed in claim 3, wherein the control means for the controlled unit includes a pair of flip flops having outputs and wherein the gate selection circuit means comprises a pair of inputs connected to the outputs of said flip flops, a plurality of write-in control outputs each connected to a corresponding one of the data setting means, a plurality of readout control outputs each connected to a corresponding one of the data setting means and a plurality of AND gates having inputs coupled to said pair of inputs and outputs coupled to said write-in control outputs and said readout control outputs.

* * * * *